（12）United States Patent
Nagy

(10) Patent No.: US 8,922,395 B2
(45) Date of Patent: Dec. 30, 2014

(54) METHOD FOR DETECTING A WHEEL OF A VEHICLE

(71) Applicant: Kapsch TrafficCom AG, Vienna (AT)

(72) Inventor: Oliver Nagy, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 22 days.

(21) Appl. No.: 13/928,113

(22) Filed: Jun. 26, 2013

(65) Prior Publication Data

US 2014/0009312 A1    Jan. 9, 2014

(30) Foreign Application Priority Data

Jul. 6, 2012 (EP) .................................... 12175308

(51) Int. Cl.
| | |
|---|---|
| *G08G 1/01* | (2006.01) |
| *G08G 1/052* | (2006.01) |
| *G01S 7/41* | (2006.01) |
| *G01S 13/50* | (2006.01) |
| *G01S 13/86* | (2006.01) |
| *G01S 13/91* | (2006.01) |

(52) U.S. Cl.
CPC ............. *G08G 1/052* (2013.01); *G01S 7/415* (2013.01); *G01S 13/50* (2013.01); *G01S 13/86* (2013.01); *G01S 13/91* (2013.01)
USPC ........................................... 340/933; 340/936

(58) Field of Classification Search
None
See application file for complete search history.

(56) References Cited

U.S. PATENT DOCUMENTS

| | | | |
|---|---|---|---|
| 2003/0102997 A1* | 6/2003 | Levin et al. ................. | 342/57 |
| 2012/0326913 A1* | 12/2012 | Nagy ........................... | 342/27 |
| 2012/0326914 A1* | 12/2012 | Nagy ........................... | 342/27 |
| 2014/0218227 A1* | 8/2014 | Stelzen et al. ............... | 342/104 |

FOREIGN PATENT DOCUMENTS

DE     102008037233 A1    3/2010

OTHER PUBLICATIONS

Extended European Search Report received for application No. 12175308.1, mailed on Oct. 17, 2012, 5 pages.

* cited by examiner

*Primary Examiner* — Travis Hunnings
(74) *Attorney, Agent, or Firm* — Fiala & Weaver P.L.L.C.

(57) ABSTRACT

A vehicle wheel is detected by emitting a measuring beam, recording frequencies of a reflected measuring beam over time as a received signal, and detecting a change in the received signal as a wheel. The vehicle comprises an onboard unit that stores information that indicates the vehicle length at least indirectly. The information is read from the onboard unit by a radio communication and the speed of the vehicle is measured. The duration of the passage of the vehicle passing a detector unit is computed based on this information and the speed. A time window in the received signal is determined that shows an approximately constant change of the received signal over the aforementioned duration. A spurious signal component is determined in a segment of the received signal that immediately precedes the time window. The received signal in the time window is compensated by the spurious signal component.

16 Claims, 3 Drawing Sheets

METHOD FOR DETECTING A WHEEL OF A VEHICLE

CROSS-REFERENCE TO RELATED APPLICATION(S)

This application claims priority to European Patent Application No. 12 175 308.1, filed on Jul. 6, 2012, the entirety of which is incorporated by reference herein.

BACKGROUND

1. Technical Field

The present application relates to techniques for detecting a wheel of a vehicle.

2. Background Art

Detecting vehicle wheels is of interest for numerous applications. For example, detecting wheels allows travel on a particular traffic area to be recognized with certainty, for example for border monitoring purposes or for triggering particular actions, such as triggering an alarm, activating lighting, opening a gate, recording a photo for monitoring purposes and the like. Modern traffic fee systems are also frequently directed to the number of axles of vehicles for fee assessment, so that the detection of wheels (wheel axles) can also constitute an important basis for imposing or checking road tolls, in particular also by way of mobile control vehicles, which are to check the number of axles of vehicles subject to tolls when passing them or in oncoming traffic.

It is known from DE 10 2008 037 233 A1 to detect wheels of a moving vehicle based on the different horizontal component of the tangential speed thereof as compared to the remaining vehicle, this tangential speed causing a corresponding Doppler frequency shift of a radar measuring beam. A radar speedometer is used for this purpose, which irradiates the lower region of passing vehicles by way of a radar lobe and time-averages a single speed measurement signal based on the received frequency mixture that is returned, the signal exhibiting signal maxima at the locations of the wheels that are used for wheel detection.

The applicant of the present application disclosed novel and reliable methods for wheel detection that are particularly insusceptible to faults and reliable based on Doppler measurements in the not previously published patent applications EP 11 450 079.6, EP 11 450 080.4 and PCT/EP 2012/061645.

The applicant has recognized that processing of the received signal is desirable to achieve further improvement of the detection reliability, so as to suppress the spurious echo of the measuring beam and thereby make the signal evaluation process more effective.

BRIEF SUMMARY

It is an object of the present patent application to overcome the problems described above and to create a further improved method for wheel detection based on Doppler measurements.

This object is achieved by a method for detecting a wheel of a vehicle by emitting an electromagnetic measuring beam having a known frequency progression over time from a detector unit, recording the frequencies of the measuring beam that is reflected to the detector unit over time relative to the known frequency progression over time as a received signal, and detecting a change of a predetermined kind in the received signal as a wheel, wherein the vehicle comprises an onboard unit, which can establish a radio communication with a transceiver of the detector unit and stores information that indicates the vehicle length at least indirectly, comprising:

reading said information from the onboard unit by way of a radio communication and measuring the speed of the vehicle;

computing the duration of passage of the vehicle passing the detector unit based on this information and the speed;

determining a time window in the received signal, which shows an approximately constant change of the received signal over this duration;

determining a spurious signal component in a segment of the received signal that immediately precedes the time window; and compensating the received signal in the time window by the spurious signal component before the aforementioned detection of the wheel is carried out.

An aspect of the present patent application is based on using so-called onboard units (OBUs), which in road toll and communication systems are employed to impose tolls for the usage of locations by vehicles, for solving the problems described above. Onboard units of this type can establish radio communications of the dedicated short range radio communications (DSRC) type with roadside radio beacons (roadside entities, RSEs) having known positions along the way, whereby they can be located in each case by the radio coverage range of the radio beacon if the DSRC radio communication is successful. Examples of such beacon-based, infrastructure-bound road toll systems include road toll systems according to the CEN-DSRC (European Committed for Standardization—Dedicated Short Range Communication) or ITS-WAVE (Intelligent Transportation Systems—Wireless Access in Vehicular Environments) standards (IEEE 802.11g). However, it is also possible for onboard units of satellite-based "beaconless" road toll systems, in which the onboard units are autonomously self-locating in a global navigation satellite system (GNSS) and transmit the location data thereof, or toll data generated therefrom, to a back office, for example by way of a mobile communication network, to be additionally equipped with DSRC radio modules, either for control readout purposes or as so-called "hybrid OBUs", which can—cooperate both with GNSS and DSRC road toll systems.

The method employs the radio communication capability of the onboard units so as to utilize radio communication during the passing of the detector unit to obtain the vehicle length, and based thereon a passage time window, which can be used in the received signal for suppressing spurious signals, such as those caused, for example, by reflections of the measuring beam by the road or echo reflections of the measuring beam that has been reflected by the road and then reflected again by the road. As a result, precise and accurate wheel detection that is insusceptible to faults can be achieved.

The information stored in the onboard unit can either directly indicate the vehicle length, or it indirectly indicates the number of axles, class and/or weight of the vehicle, based on which—for example using stored association tables—the approximate vehicle length can be determined The read-out of the information that directly or indirectly indicates the vehicle length from the onboard unit has the advantage—as compared to locally measuring the vehicle length by way of appropriate laser, radar or ultrasonic sensors as the vehicle passes—that measuring errors, as they could occur otherwise, for example, due to windows in buses, loading surfaces of trucks and the like, are prevented from being included in the wheel detection.

The speed of the vehicle can be measured in a variety of ways, for example using a laser speedometer, light barriers, detection loops in the road, cameras and the like. The speed of the vehicle may be obtained by way of Doppler measurement based on radio communication between the onboard unit and the transceiver, and more particularly based on the radio communication that is used for reading out the aforementioned information. Radio communication with the onboard units can thus be used to obtain both the length information and the speed, and based thereon a passage time window can be computed.

According to a further advantageous embodiment, the received signal can be compensated for by those frequency components that are caused by the speed of the vehicle—before the detection of the wheel is carried out, which further increases detection reliability.

For the same reason, it is particularly advantageous to detect one of the changes in the received signal described above as being a wheel only if this change is within the time window, so that faulty detections, which can be attributed to measuring beam echoes outside the time window for example, are prevented.

Thereafter, wheels that are detected during one and the same time window may be associated with one and the same vehicle. The number of wheels of a vehicle can be used as a basis for road tolling that is dependent on vehicle axles, for example.

In a further embodiment of the method, the received signal is compared to the spurious signal component in a segment immediately following the time window, and the presence of a trailer of the vehicle is detected based thereon. The presence of a trailer can serve as a basis for road tolling that is dependent on trailers, for example.

According to a further advantageous embodiment, in a first step the vehicle length, or a vehicle property directly indicating the same, is measured by a stationary or mobile control device, the aforementioned information is formed based thereon and stored in the onboard unit by way of a radio communication. The control device, which measures this data, can be one of the geographically distributed roadside radio beacons (RSEs) of a beacon-based toll system, for example, and this measurement can be carried out in specially equipped radio beacons of this system. For example, the radio beacon can measure the vehicle length by way of a laser scanner, a camera, a light barrier or the like. As an alternative, the measured vehicle property can be the number of axles, class and/or weight of the vehicle, which can likewise be measured by appropriate scanners, light barriers, cameras, scales or the like.

The method is suited for any type of measuring beam having a frequency that is subject to a Doppler effect-related frequency shift upon reflection by a moving target, such as a rotating wheel in this case. The measuring beam could be a laser or ultrasonic beam, for example. The measuring beam may be a radar beam that is emitted by a directional antenna, such as in the frequency range above 70 GHz, which can be focused or directed accordingly well.

The method is suited for a combination with any conceivable variant of wheel detection methods based on an evaluation over time of the Doppler shift of the measuring beam. Some variants are characterized in that the described change of the predetermined kind is a jump, an increase, a drop or a spread spectrum of the received signal above a predetermined threshold value, and combinations of these variants are also conceivable.

The method is suited both for stationary and for mobile detector units. The detector unit may be carried by a control vehicle, so that the method can be employed, for example, so as to check vehicles in oncoming traffic, or vehicles on neighboring lanes in the same driving direction, and detect the wheels of the same.

The method is also suited for any type of radio communication that the aforementioned onboard units can carry out, for example also for mobile radio communication in terrestrial mobile communication networks. However, radio communication within the framework of beacon-supported road toll systems according to the CEN-DSRC or ITS-WAVE standards may be used.

Further features and advantages, as well as the structure and operation of various embodiments, are described in detail below with reference to the accompanying drawings.

BRIEF DESCRIPTION OF THE DRAWINGS/FIGURES

Embodiments will be described in more detail hereafter with reference to the accompanying drawings. In the drawings.

Figure 1:
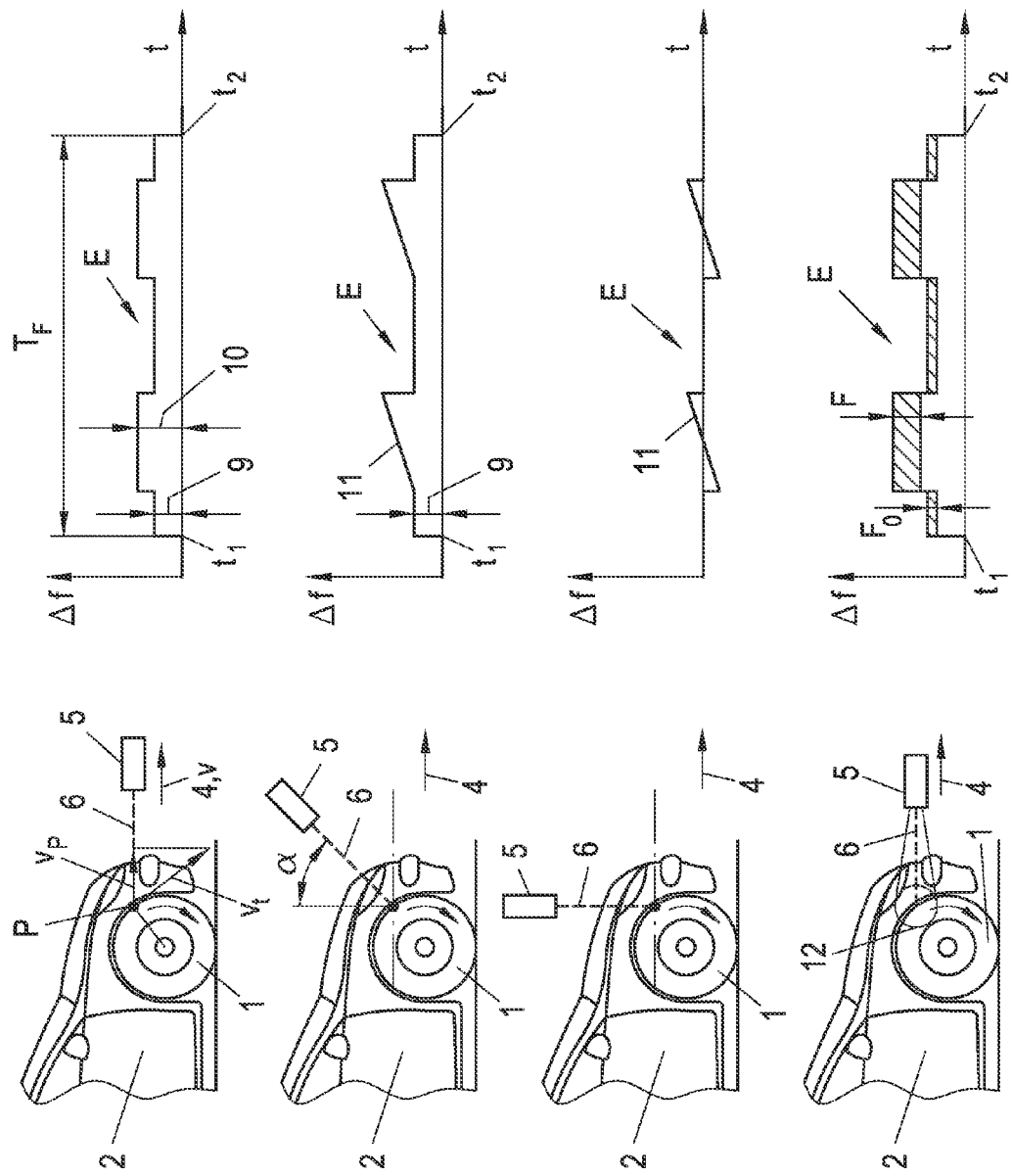
FIGS. 1a to 1d are exemplary idealized Doppler shift progressions over time as received signals at various angular positions of a Doppler measuring beam relative to a wheel, according to embodiments.
Figure 2:
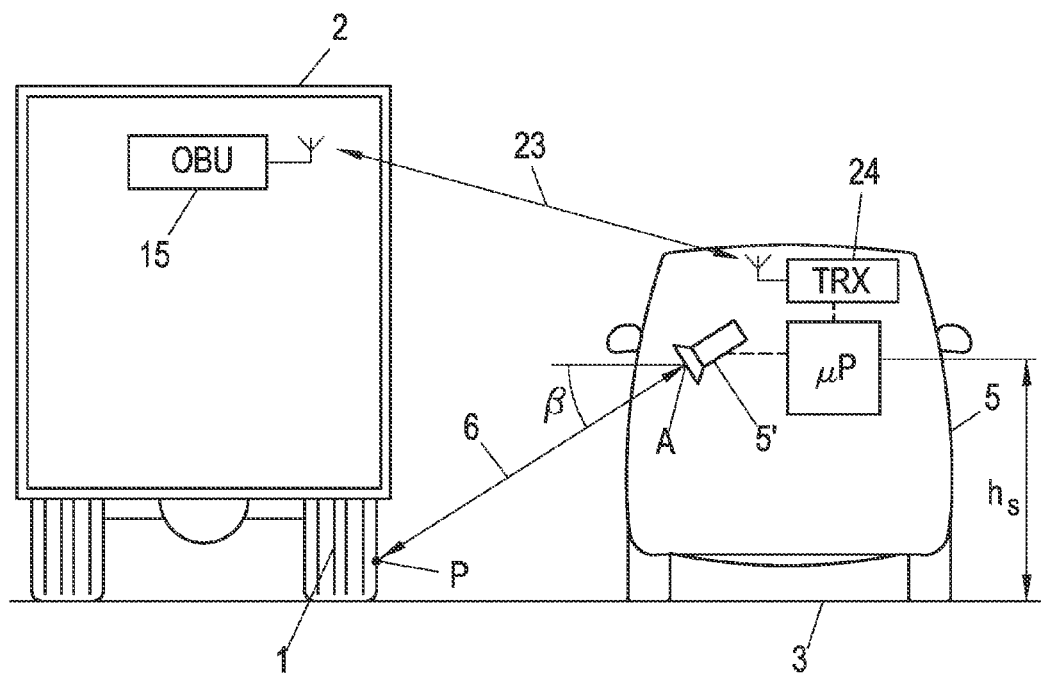
FIG. 2 shows a method based on an exemplary beam path between a detector unit that is configured as a control vehicle and a vehicle to be checked, as seen in the driving direction, according to an example embodiment.

Embodiments will now be described with reference to the accompanying drawings.

DETAILED DESCRIPTION

The present application relates to a method for detecting a wheel of a vehicle by emitting an electromagnetic measuring beam having a known frequency progression over time from a detector unit, recording the frequencies of the measuring beam that is reflected to the detector unit over time relative to the known frequency progression over time as a received signal, and detecting a change of a predetermined kind in the received signal as a wheel.

FIGS. 1a-1d, 2, and 3 show the principle of detecting a rotating wheel 1 of a vehicle 2, which is moving on a road 3, more precisely on a lane 3' thereof, in a driving direction 4. The wheel detection method is carried out by way of or in a detector unit 5, which in the example shown is mobile and configured as a control vehicle. The detector unit or the control vehicle 5 is moving on a second lane 3'' of the road 3 in a driving direction 4', for example, which may be—but not necessarily—anti-parallel to the driving direction 4 of the vehicle 2 to be checked. Of course, the detector unit 5 could also be stationary, for example it could be set up at the roadside of the road 3 or lane 3'.

Figure 3:
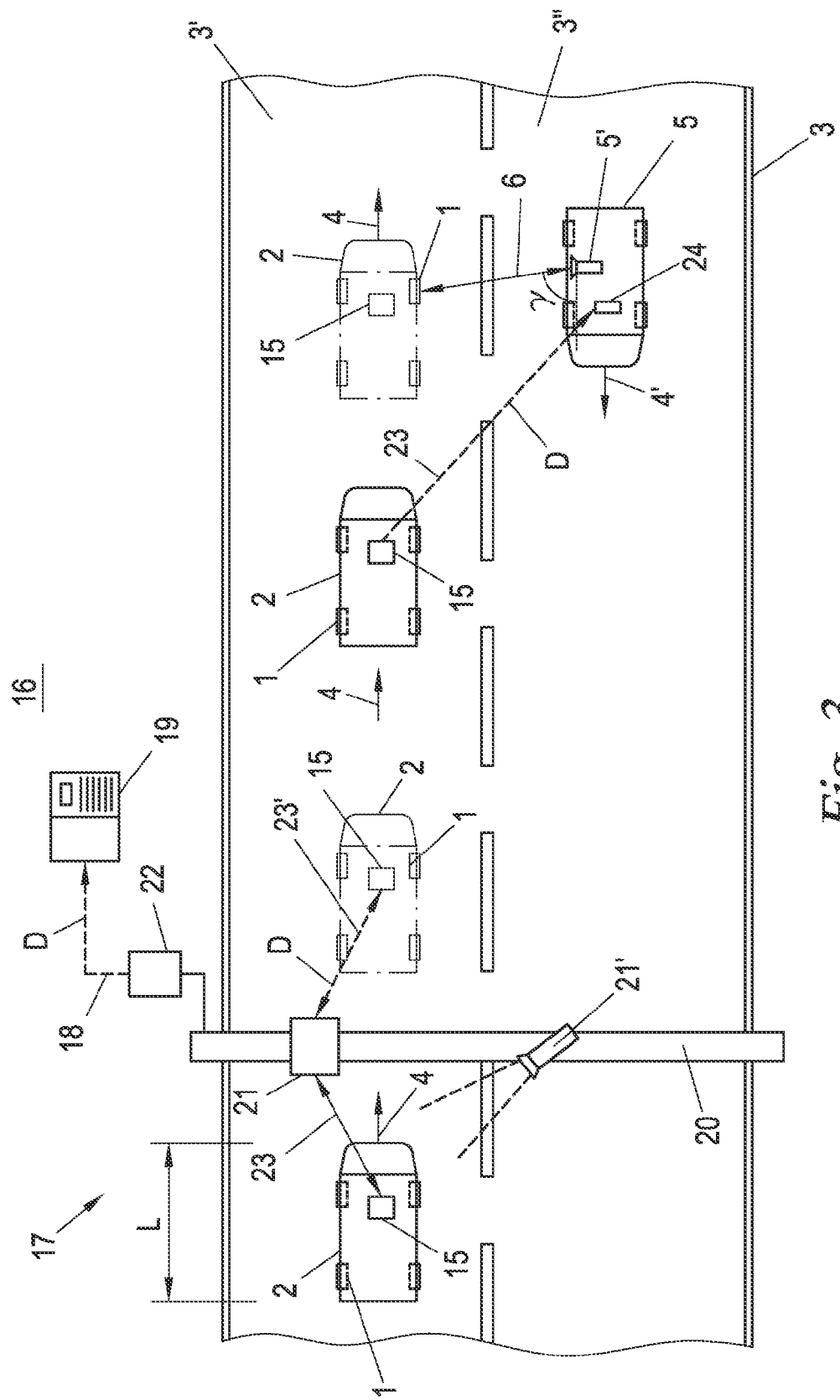
FIG. 3 shows various variants of the method of FIG. 2 based on a schematic top view onto a road section comprising a stationary control device, a detector unit configured as a control vehicle, and a vehicle to be checked in consecutive phases of the method, according to an example embodiment.

The detector unit 5 emits a measuring beam 6, for example an ultrasonic, a LIDAR or a radar measuring beam, to the vehicle 2, or the wheels 1 thereof, upon passing so as to detect the wheels 1. It is apparent from the side views of FIGS. 1a to 1d that the measuring beam 6 can be directed at the wheel 1 from the front (FIG. 1a), obliquely from the front and above (FIG. 1b), from above (FIG. 1c) or any other direction of the drawing plane of FIGS. 1a-1d at an angle α relative to the vertical. It is apparent from FIG. 2 that the measuring beam 6, as seen looking in the driving direction 4, can be emitted by the detector unit 5 at differing angles β relative to the horizontal, for example by an antenna 5' in a radiation position A at a predetermined height $h_s$ above the road 3. As an alternative or in addition, the measuring beam 6 can also be emitted from various radiation positions at differing heights. The top view of FIG. 3 shows that the measuring beam 6 can have differing angles γ relative to the driving direction 4 (or 4'), for example directed obliquely forward from the detector unit 5.

The detector unit 5 is a Doppler detector and, as is known in the prior art, evaluates the received frequency of the measuring beam 6 that is reflected by the vehicle 2 or the wheels 1 thereof, wherein the Doppler effect-related frequency shift Δf between the emitted and reflected measuring beams 6 can be used to determine the component $v_p$, as located (projected) in the direction of the measuring beam 6, of the relative speed v of the vehicle 2, or the tangential speed $v_t$ of the wheel 1, at the respective point P of the—impingement region of the measuring beam 6. In the right halves of FIGS. 1a to 1d, the progression over time of this Doppler effect-related frequency shift, in short Doppler shift, Δf is plotted against the time t, and hereafter is also referred to as the "received signal" E of the detector unit 5.

If the measuring beam 6 is emitted parallel to the plane of the road 3 (α=90°, β=0°, γ≠90°) 90°, the received signal E shown in FIG. 1a is obtained, showing a sudden increase 9 as soon as the measuring beam 6 impinges on the body 2 of the vehicle 2 traveling at the speed v, and an additional jump 10 during passage of the wheel 1. If the measuring beam 6 impinges on the wheel 1 or vehicle 2 slightly obliquely from above (0<α<90°, 0<β<90°, 0<γ<180°), the received signal E shown in FIG. 1b is obtained, showing an increase (or a drop, depending on the viewing and passage direction) 11 during passage of a wheel 1. A beam direction obliquely from above with α=0°, 0<β≤90° and γ=90° results in the increases (or drops, depending on the viewing direction) shown in FIG. 1c, which have been adjusted for the speed v of the vehicle 2.

FIG. 1d shows that, in the case of a beam cross-section of the measuring beam 6 that is expanded in real terms and does not have the ideal-punctiform shape in the impingement region 12 of the measuring beam 6 onto the wheel 1 or the vehicle 2, always a superposition of the differing (tangential) speeds or projected speeds $v_p$ caused by differing points P in the impingement region 12 occurs, which during passage of a wheel 1 results in a received frequency mixture, which is to say a fragmentation or spread F of the Doppler shift over time or of the received signal E, which is larger than the spectrum spread $F_0$ that occurs merely during passage of the body of the vehicle 2. Such a spread spectrum F can likewise be established as a criterion for the occurrence of a wheel 1.

The occurrence of a wheel 1 on a passing vehicle 2 can thus be detected by a change of a predetermined kind, such as sudden frequency change 10, an increase or a drop 11 and/or a spread spectrum F in the received signal E, each exceeding a predetermined threshold value.

The detector unit 5 can be of any type known from the prior art for the described Doppler evaluation and detection, either using a continuous, modulated or pulsed measuring beam 6. In the case of a continuous measuring beam 6, a Doppler frequency shift between the natural frequencies ("carrier frequencies") of the emitted and of the reflected measuring beam 6 can be determined by way of interference measurement, for example. In the case of a pulsed or modulated measuring beam, a Doppler shift between the pulse rates or modulation frequencies of the emitted and of the reflected measuring beam 6 can be measured. In the present application, all such natural, carrier, pulse or modulation frequencies are understood to be included in the terms "emitted frequency" of the measuring beam 6 and "received frequency" of the reflected measuring beam 6 that are used here, which is to say the term 'received frequency' comprises any frequency of the measuring beam 6 that can be influenced by a Doppler effect.

Figure 4:
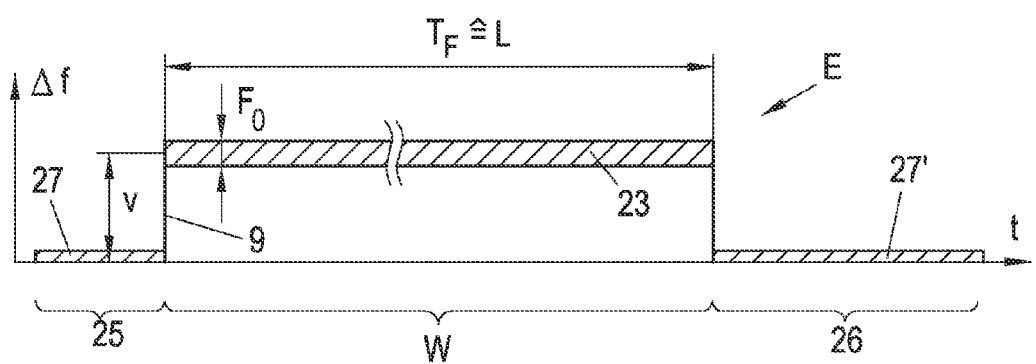
FIG. 4 shows the determination of the time window and spurious signal components of the received signal preceding and following the time window in the frequency/time plane, according to an example embodiment.

FIG. 4 shows a received signal E, as it occurs when the vehicle 2 passes the detector unit 5, if the measuring beam 6 does not impinge on a wheel 1, but "only" on the body of the vehicle 2, which is moving at the speed v, taking the geometry-related spread spectrum $F_0$ into consideration. It is apparent from FIGS. 1a, 1b, 1d and 4 (which is to say excluding FIG. 1c, where the direction of the measuring beam 6 is normal to the driving direction 4 of the vehicle 2) that a substantially constant change, and more particularly the sudden increase 9 by the speed v, takes place in the received signal E for the duration $T_F$ during which the vehicle passes the detector unit 5. The duration $T_F$ of this "passage time window" can be used to improve the evaluation of the received signal E for wheel detection, and more particularly with the aid of the method described—hereafter.

The method is based on the use of onboard units (OBUs) 15, which are carried by a respective vehicle 2, so as to allow the vehicle to participate in a road toll or communication system. Because the detection of wheels 1 of a vehicle 2 is frequently used as a basis for toll assessment, notably for road toll systems, the OBUs 15 can, at the same time, be used in such road toll systems for the purposes that are set out herein.

FIG. 3 shows sectional views of a road toll system 16, comprising a plurality of geographically distributed control devices 17 (only one being shown), which are set up along the road 3 at mutual distances from each other, for example. The control devices 17 are connected to a back office 19 of the road toll system 16 by way of data lines 18. The road toll system 16, and more particularly the control devices 17 thereof, impose tolls (charge fees) for the location usages by vehicles 2, for example the driving on the road 3.

For this purpose, the control devices 17 can be configured, for example, as radio beacons comprising a transceiver 21 that is arranged on a gantry 20 and a connected beacon processor 22 and they can carry out dedicated short range communication (DSRC) with the OBU 15 of a passing vehicle 2 by way of the transceiver 21. For example, the DSRC radio communication 23 can result in a toll transaction, which is reported to the back office 19 via the beacon processor 22 and the data connection 18 and/or is stored in the OBU 15.

The control devices (radio beacons) 17, the OBUs 15 and the internal transceivers thereof for carrying out the DSRC radio communication 23 can be composed according to all known DSRC standards, notable CEN-DSRC, ITS-G5 or WAVE (wireless access in vehicular environments). In the course of the passing of a radio beacon 17, each DSRC radio communication 23 can, for example, debit a current account in the back office 19 and/or the OBU 15 with a particular usage fee and then constitutes a "debit transaction"; however, the DSRC radio communication 23 can also form identification, maintenance, or software update transactions or the like within the framework of the road toll system 16.

The DSRC radio communication 23 can, in particular, also be used for wirelessly polling (reading out) data that is stored in the OBUs 15, such as master data, identification data, transaction data, recording data and the like. Such wireless polls 23 can originate not only from the stationary control devices or radio beacons 17, but also from "mobile" radio beacons 17 in the form of a detector unit 5 configured as a control vehicle. In other words, the detector unit 5 can also function as a radio beacon 17, and in addition, a radio beacon 17 can conversely function as a detector unit 5. Everything that is described with regard to the DSRC communication capability of the radio beacon 17 therefore also applies to the detector unit 5, which for this purpose is equipped with a dedicated transceiver 24, and vice versa.

Wireless polling of OBUs 15 via DSRC radio communication 23 can additionally be carried out in global navigation satellite (GNSS) road toll systems 16, in which, instead of a network of terrestrial radio beacons 17, the OBUs 15 in each case are autonomously self-locating by way of a GNSS receiver and transmit the locations thereof, or the toll transactions determined based thereon, to the back office 19, for example by way of the radio beacon network or a separate mobile communication network. Again, the OBUs 15 can be equipped with DSRC transceivers for wireless polling by radio beacons (control devices) 17 or control vehicles (detector units) 5. The method described here, and the detector unit 5 discussed here, are therefore suited for cooperating both with beacon-based and with satellite-based road toll systems 16.

Radio communication 23 between the transceiver 24 of the detector unit 5 and the internal transceiver (not shown) of the OBU 15 is thereafter used to read out information D that is stored in the OBU and is related to the length L of the vehicle 2, so as to compute the passage duration $T_F$ based thereon and with knowledge of the speed v of the vehicle 2 and the relationship $T_F=L/v$.

The information D stored in the OBU 15 can indicate the vehicle length L both directly and indirectly. In the latter case, for example, it indicates the number of axles, class and/or weight of the vehicle, based on which—for example using vehicle tables that are stored in the detector unit 5 or can be retrieved therefrom—the vehicle length L that has been previously stored for a particular number of axles, class and/or a particular weight can basically be "approximately" determined from the information D.

The speed v of the vehicle 2, in turn, can be measured in a variety of ways by the detector unit 5, for example by way of a laser speedometer, a camera, light barriers and the like, which are carried by the detector unit 5 and measure the speed v of the passing vehicle 2. To this end, it suffices to measure the speed v only at a particular point in time during, or immediately before or after, the vehicle passage. As an alternative, it is also possible to measure and use the maximum speed v of the vehicle that occurs during (or in the region) of the vehicle passage, so as to compute the minimum passage duration $T_F$ and use it to increase the detection reliability.

In the example shown in FIGS. 1a to 4, the speed v is determined directly from the radio communication 23, and more particularly by way of Doppler measurement using the radio communication 23 itself. In this case, the method is based on the use of special transceivers 24 in the detector unit 5, which are able to determine at least the approximate speed v of the vehicle 2 in the driving direction 4 based on the communication direction between the OBU 15 and transceiver 24 in relation to the driving direction 4' of the detector unit 5, the angular conditions resulting therefrom, and the Doppler shift of the radio communication 23 as measured in the direction of the radio communication 23, and consequently the relative movement between the onboard unit 15 and transceiver 24. The radio communication 23 that is used for this purpose may be exactly that which is also used to read the information D from the OBU 15.

As an alternative, the speed v could also be measured with the aid of the measuring beam 6 itself, which is to say directly from the received radio signal E, for example based on the magnitude of the sudden frequency changes 9.

The information D indicating the vehicle length L can be previously stored in the OBU 15, for example it can be stored upon delivery of the OBU 15 to the user in a vehicle-specific manner or entered into the OBU 15 by the user himself after delivery. As an alternative, the vehicle length L, or a vehicle property indirectly indicating the same such as the number of axles, class and/or weight of the vehicle 2, can be measured by a stationary or mobile control device 17 along the path of the vehicle 2, for example by way of a scanner 21', a camera, a light barrier or the like, and based thereon the information D can be formed and stored in the OBU 15 via a radio communication 23', as is shown in the left half of FIG. 3.

Thus, as a vehicle 2 passes the detector device 5, the information D that is stored in the OBU 15 is read out via a radio communication 23 and the vehicle length L is—determined based thereon. Simultaneously, shortly before, or shortly thereafter, the speed v of the vehicle 2 is measured, so that the duration $T_F$ of the vehicle passage can be computed based on the determined vehicle length L and the measured speed v, as was described above.

According to FIG. 4, having knowledge of the duration $T_F$, a time window W is now determined in the received signal E, the length of the time window being equal to the duration $T_F$ and the time window coinciding, in terms of time, with the boundaries $t_1$, $t_2$ of every constant change 9 of the received signal E that can be attributed to the passing of the vehicle body. In other words, a time window W having the duration $T_F$ is positioned along the time axis t of the received signal E so that the starting and ending points thereof approximately agree with the starting and ending points $t_1$, $t_2$ of a constant change 9.

Subsequently, during a time segment 25 of the received signal E that immediately precedes, or during a time segment 26 that immediately follows, the passage time window W, a spurious signal component 27 is determined, which thereafter is used to compensate the received signal E in the time window W by this spurious signal component 27. For example, a frequency analysis of the received frequencies that occur in segment 25 and/or segment 26 could be carried out, and these could be cleared, which is to say subtracted, from the received signal E in the time window W.

To this end, the segment 25 preceding the time window W or the vehicle passage $T_F$ may be used, because the vehicle 2 could have a trailer, which in the following segment 26 could erroneously be considered a spurious signal component. According to a further embodiment of the method, a signal component 27' that occurs in the following segment 26 could thus be compared to the spurious signal component 27 of the preceding segment 25, and the presence of a trailer of the vehicle 2 can be concluded if the signal component 27' deviates significantly from the spurious signal component 27.

Moreover, the passage time window W can also be used to associate all those wheels 1 that are detected during the same passage time window W with one and the same vehicle 2, so as to compute the number of axles of a vehicle 2 based thereon.

Moreover, the received signal E can be compensated in the time window W by those frequency components that are caused by the speed v of the vehicle 2, for example the constant change 9 can be subtracted, so as to facilitate the detection of the changes 10, 11, F in the time window W of the received signal E.

Of course, the detector unit 5 can be implemented for this purpose both in the shown mobile form as a control vehicle, and in stationary form, for example using existing radio infrastructure, such as WAVE or DSRC radio beacons of a road toll system or WLAN radio beacons or a roadside Internet infrastructure. This allows existing transceiver parts of WLAN, WAVE or DSRC radio beacons, for example, to be used as the transceiver part of a Doppler detector unit 5. The method can thus be implemented, for example, as a software application that runs on a conventional mobile or stationary WLAN, WAVE or DSRC control device or radio beacon.

Previously, it was assumed that the emitted frequency of the measuring beam 6 is constant, which is to say its progression over time is a constant progression. However, it is also possible for the detector unit 5 to emit a measuring beam 6 having an emitted frequency progression that is not constant over time, for example in the case of frequency hopping methods, in which the frequency changes continually—according to a predetermined or known pattern. The plotted received frequency (mixture) progressions over time or received signals E of FIGS. 1*a* to 1*d* and 4 are plotted relative to the previously known progression over time of the emitted frequency of the measuring beam 6—either in constant or changing form —, which is to say referenced or standardized thereto, so that the effect of known emitted frequency progressions over time can be compensated for.

CONCLUSION

The invention is thus not limited to the shown embodiments, but encompasses all variants and modifications that are covered by the scope of the accompanying claims. While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the described embodiments should not be limited by any of the above-described exemplary embodiments, but should be defined only in accordance with the following claims and their equivalents.

What is claimed is:

1. A method for detecting a wheel of a vehicle by emitting an electromagnetic measuring beam having a known frequency progression over time from a detector unit, recording frequencies of the measuring beam that is reflected to the detector unit over time relative to the known frequency progression over time as a received signal, and detecting a change of a predetermined kind in the received signal as a wheel,
   wherein the vehicle comprises an onboard unit, which can establish a radio communication with a transceiver of the detector unit and stores information that indicates the vehicle length at least indirectly, comprising:
   reading said information from the onboard unit by way of a radio communication and measuring the speed of the vehicle;
   computing the duration of passage of the vehicle passing the detector unit based on this information and the speed;
   determining a time window in the received signal which shows an approximately constant change of the received signal over the aforementioned duration;
   determining a spurious signal component in a segment of the received signal that immediately precedes the time window; and
   compensating the received signal in the time window by the spurious signal component before the aforementioned detection of the wheel is carried out.

2. The method according to claim 1, wherein the information that is stored in the onboard unit directly indicates the vehicle length.

3. The method according to claim 1, wherein the information that is stored in the onboard unit indicates the number of axles, class and/or weight of the vehicle, based on which the approximate vehicle length is determined.

4. The method according to claim 1, wherein the speed of the vehicle is measured by way of Doppler measurement based on a radio communication between the onboard unit and the transceiver.

5. The method according to claim 4, wherein the Doppler measurement is carried out based on the radio communication that is used for reading out the aforementioned information.

6. The method according to claim 1, wherein the compensation of the received signal by frequency components that are caused by the speed of the vehicle before the detection of the wheel is carried out.

7. The method according to claim 1, wherein a change is only detected as a wheel if the change is within the time window.

8. The method according to claim 1, wherein wheels that are detected during one and the same time window are associated with one and the same vehicle.

9. The method according to claim 1, wherein the received signal is compared to the spurious signal component during a segment that immediately follows the time window, and the presence of a trailer of the vehicle is detected based thereon.

10. The method according to claim 1, wherein the vehicle length, or a vehicle property indirectly indicating the same, is measured by a stationary or mobile control device, and based thereon the information is formed and stored in the onboard unit by way of a radio communication.

11. The method according to claim 10, wherein the measured vehicle property is the number of axles, class and/or weight of the vehicle.

12. The method according to claim 1, wherein the measuring beam is a radar beam that is emitted by a directional antenna, in the frequency range above 70 GHz.

13. The method according to claim 1, wherein the aforementioned change of a predetermined kind is a jump, an increase, a drop or a spread spectrum of the received signal, in each case above a predetermined threshold value.

14. The method according to claim 1, wherein the detector unit is carried by a control vehicle.

15. The method according to claim 1, wherein the radio communication takes place according to the CEN-DSRC or ITS-WAVE standards.

16. A detector unit configured to detect a wheel of a vehicle that comprises an onboard unit that stores information that indicates the vehicle length at least indirectly, comprising:
   an antenna configured to emit an electromagnetic measuring beam having a known frequency progression over time; and
   a transceiver configured to read said information from the onboard unit by way of a radio communication and measure the speed of the vehicle;
   the detector unit configured to record frequencies of the measuring beam that is reflected to the detector unit over time relative to the known frequency progression over time as a received signal, and to detect a change of a predetermined kind in the received signal as a wheel, the detector unit configured to compute the duration of passage of the vehicle passing the detector unit based on the information and the speed;

the detector unit configured to determine a time window in the received signal which shows an approximately constant change of the received signal over the aforementioned duration;

the detector unit configured to determine a spurious signal component in a segment of the received signal that immediately precedes the time window; and the detector unit configured to compensate the received signal in the time window by the spurious signal component before the aforementioned detection of the wheel is carried out.

* * * * *